United States Patent [19]
Fischer

[11] Patent Number: 6,016,298
[45] Date of Patent: Jan. 18, 2000

[54] CALLING CARD

[75] Inventor: Gerhard Fischer, Emmen, Switzerland

[73] Assignee: Adivan High Tech AG, Wangen, Switzerland

[21] Appl. No.: 09/049,697

[22] Filed: Mar. 27, 1998

[30] Foreign Application Priority Data

| Jun. 25, 1997 | [CH] | Switzerland | 1537/97 |
| Mar. 5, 1998 | [CH] | Switzerland | 0526/98 |

[51] Int. Cl.[7] .................................................. G11B 7/02
[52] U.S. Cl. ........................................ 369/75.1; 235/487
[58] Field of Search ............................ 369/75.1; 235/487

[56] References Cited

U.S. PATENT DOCUMENTS

| 3,839,601 | 10/1974 | Kimura et al. . |
| 4,014,604 | 3/1977 | Schwartz . |
| 4,114,181 | 9/1978 | Itoh . |
| 4,592,042 | 5/1986 | Lemelson et al. . |
| 4,680,460 | 7/1987 | Drexler . |
| 4,683,371 | 7/1987 | Drexler . |
| 4,745,268 | 5/1988 | Drexler . |
| 4,868,373 | 9/1989 | Opheij et al. . |
| 4,916,687 | 4/1990 | Findo .................................. 369/75.1 |
| 5,045,676 | 9/1991 | Kime . |
| 5,059,774 | 10/1991 | Kubo et al. . |
| 5,107,099 | 4/1992 | Smith . |

FOREIGN PATENT DOCUMENTS

| 0 230 069 | 7/1987 | European Pat. Off. . |
| 292 720 | 11/1988 | European Pat. Off. . |
| 0 479 340 | 4/1992 | European Pat. Off. . |
| 0 618 711 | 10/1994 | European Pat. Off. . |
| 343 982 | 5/1995 | European Pat. Off. . |
| 2 668 277 | 4/1992 | France . |
| M 97 02 996 | 3/1997 | Germany . |
| M 97 04 019 | 4/1997 | Germany . |
| 297 08 978 | 5/1997 | Germany . |
| 297 09 648 | 6/1997 | Germany . |
| 56-003471 | 1/1981 | Japan . |
| 04040586 | 2/1992 | Japan . |
| WO 99/12159 | 3/1999 | WIPO . |

*Primary Examiner*—Harold I. Pitts
*Attorney, Agent, or Firm*—Pauley Petersen Kinne & Fejer

[57] ABSTRACT

A calling card which can be inserted into a conventional CD drive and read. The calling card is centered in a CD drive. Thus, the calling card becomes a calling card CD with a printed upper side, which can be visually detected by an eye, and an underside on which data can be recorded and read by a computer.

13 Claims, 1 Drawing Sheet

CALLING CARD

BACKGROUND OF THE INVENTION

1. Field of The Invention

This invention relates to a calling card made of plastic with a printed upper side with directly visually readable information.

2. Description of Prior Art

Calling cards have been known and used for a long time. Known calling cards are printed on paper or other base stock and have a name, company designation and other visually recognizable information. Since the format is relatively small, only a relatively limited amount of information can be printed on known calling cards. The amount of information is sufficient when directly presented to a person being visited. However, when later looking at known calling cards it would be nice if considerably more information would be available, such as related to the presenter, or respectively the company, in order to jog and complete the memory of the person being visited.

SUMMARY OF THE INVENTION

It is one object of this invention to provide a calling card on which information can be printed in a conventional way, and which also makes it possible to supply a large amount of information.

This object is attained by this invention as disclosed in the claims.

An additional advantage of this invention is that for example the complete company information, such as the company program, catalogs, order forms and, for example, even an automatic internet access to the home page of the company, can be provided as information on the calling card.

A further advantage of this invention is that the calling card in accordance with this invention can also be produced in different formats.

BRIEF DESCRIPTION OF THE DRAWINGS

This invention will be described below in connection with the drawings.

DESCRIPTION OF PREFERRED EMBODIMENTS

This invention will now be described in more detail in connection with the drawings.

One basic concept of this invention is a combination of a calling card with a CD-ROM. On one hand, known calling cards are mostly made of paper, semi-cardboard or plastic. Known calling cards have a defined format, approximately the same as is customary and widespread all over the world in connection with credit cards. On another hand, various companies have already shipped CDs with music or with catalog and company information. However, these cannot be inserted in calling card holders, because they are too large and they are round. This also applies to mini-CDs.

The calling card of this invention now makes both possible. This is a CD with format corresponding to that of a calling card, but nevertheless can be inserted into a normal CD drive and read. Thus, the calling card of this invention is a calling card CD.

The usual CD drive is known to contain a central drive spindle and a circular-shaped drive centering device, into which a CD is inserted. The drive centering device centers the inserted CD, and the CD is driven by the drive spindle in the drive. During operation the CD is guided in the drive centering device on a small air cushion and is driven by the spindle and the central positioning device. So that normal CDs and mini-CDs can be used in the same drive, centering the CDs is accomplished in two stages matched to the two different diameters. It is known to mechanically separate the drive and the centering device, so that the CDs are not mechanically stressed and damaged in the area of the drive opening.

For advertising purposes, some conventional CDs are produced in defined shapes which differ from the round disk. But such conventional CDs have a shape wherein the edge always corresponds at several places to the normal circumference of CDs. If such CDs are inserted into the drive, the spindle engages the central drive opening of the CD, and the CD rests with several places of its circumference inside on the centering edge of the drive centering device. These CDs are called "shaped CDs". Their shape is milled from a customary round CD.

However, a CD of the size and shape of a calling card is too small for resting against the drive centering device. In no way does the format of a calling card correspond to the format of a normal or a mini-CD. It is important to center a CD in a conventional CD drive. According to this invention, the calling card is designed as a CD-ROM in a calling card format and has suitable means for centering the calling card, designed as a CD-ROM, in the CD drive.

Figure 2:
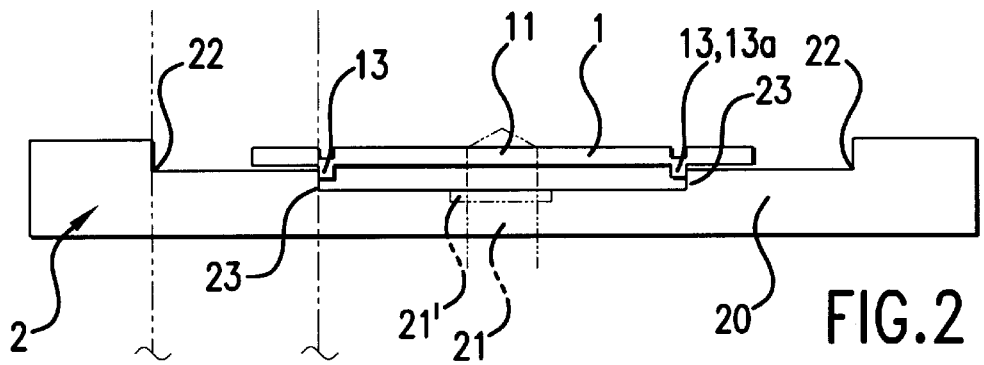
FIG. 2 shows a front view of the calling card of FIG. 1, inserted into a CD-ROM drive.
Figure 1:
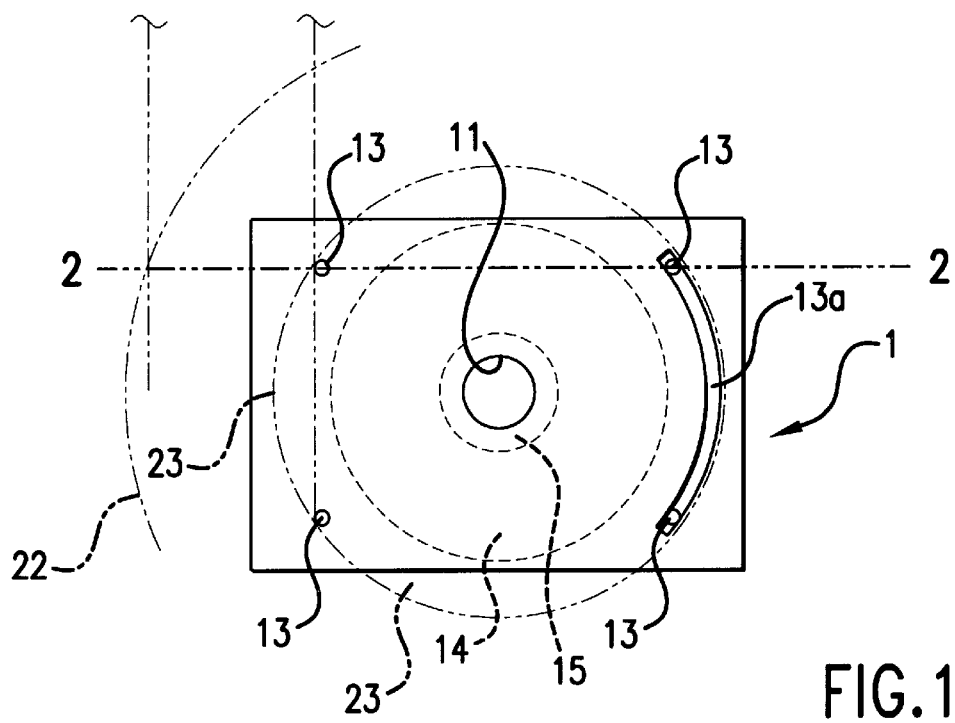
FIG. 1 shows a bottom view of one preferred embodiment of a calling card in accordance with this invention.
Figure 3:
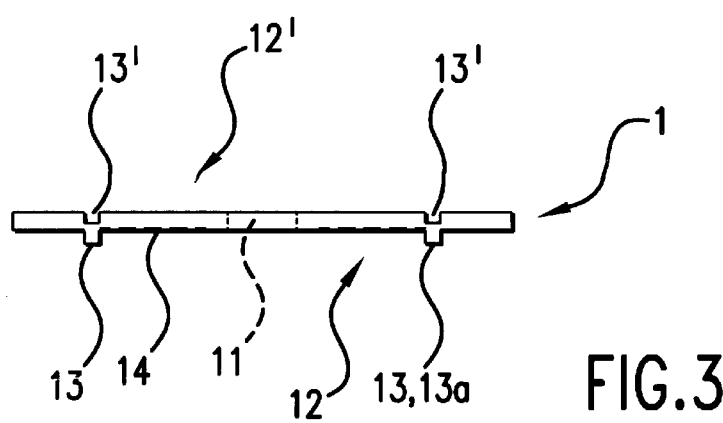
FIG. 3 shows a cross-sectional view of a calling card in accordance with one preferred embodiment of this invention.

A calling card in accordance with this invention is shown in FIG. 1, in a bottom view. The calling card of this invention has a format which is customary for calling cards. Like a conventional CD, the calling card is made of the same material and in the same way. As shown in FIG. 1, drive opening 11, which is bordered by a placement area 15, is located in the center. Adjoining the placement area 15 is the data area 14, on which data can be written and which can be read in the CD drive. A number of centering pins 13, in this case preferably four, are arranged on a circle. The centering pins 13 are arranged in such a way that, when the calling card is inserted into the CD drive, the centering pins 13 rest against the centering shoulder 23, as shown in FIG. 2, and maintain the calling card centered. The means for centering in the CD drive can, in place of a number of individual nubs or pins 13, alternatively comprise centering beads 13a, which are arranged on both sides symmetrically relative to the drive opening 11, as shown on one side only in FIG. 2. The centering beads 13a form a sector of a circle, wherein the radius is selected such that the outer edges of the centering beads 13a rest against the centering shoulder 23, with minimal play.

In FIG. 2, a calling card 1 in accordance with this invention is inserted into a drive drawer 20 of a CD drive 2, as shown in a section along line A—A in FIG. 1. The drive drawer 20 has a first centering shoulder 22 for a conventional CD and a second centering shoulder 23 for a conventional mini-CD. The drive spindle 21 and the drive placement device 21' of the drive and the drive opening 11 of the calling card 1 are shown in broken lines since they are not located in the section A—A. With downward projecting centering means 13, 13a, the calling card 1 rests against the centering edge 23 of the drive for conventional mini-CDs, which assures dependable centering of the calling card 1 in the drive. The calling card 1 simultaneously rests on the drive placement device 21', and the drive spindle 21 projects through the drive opening 11. A minimal air cushion is formed between the calling card 1 and the drawer with respect to the centering edge 23, during rotation of the calling card 1. In this way the calling card 1 is clearly and cleanly centered when inserted into the drive and is not mechanically stressed when running.

The production of the shape does not take place by milling the shape out of a finished CD, but by a stamping process. It is thus possible to produce the shape and the means for centering the calling card CD 1 in one single production step. The stamping process must be performed slowly, so that the shape is cleanly cut around the circumference and the centering pins can be formed in the process, and so that when producing the centering pins 13a deformation, but not a break-through, occurs. In the process the centering pins 13 are slowly pushed downward by small dies in the stamping tool and the material is plastically deformed, creating minimal depressions 13' in the printed upper side 12'. During the stamping process the shape is stamped out on the one hand and, on the other hand, the material is only deformed in the area of the centering pins 13 to be formed. This procedure makes it possible to perform the production of the calling card 1 as a calling card CD 1 in one process step and therefore very cost-effectively and gently. It is of course also possible to glue the centering pins 13 to the underside 12 in a separate process step.

The calling card 1 can be imprinted, as before, on the upper side with the name, address and further information. The underside, the data side, is a customary CD, on which data which can be read by a computer can be inscribed. For example, a company profile, a company catalog and similar information, including multimedia, can be recorded. It is also possible to store an entire computer program on the calling card 1. Automatic access to a computer or a home page are mentioned as examples.

The technique for producing the calling card 1 and the arrangement of the centering pins 13 now makes it possible to design the calling card 1 in approximately any desired shape, such as with approximately any desired outer contour, since the calling card 1 is centered in the drive by the centering pins 13 and not by the exterior circumference. For example, such a calling card 1 can have the exterior contour of a company logo.

What is claimed is:

1. A plastic calling card with an upper side printed with directly visually readable information, comprising: an underside (12) of the calling card having electronically processed data, which can be reproduced one of optically and acoustically by a CD drive, and the plastic calling card having means for receiving the plastic calling card in a centered position in a CD drive (2).

2. The calling card in accordance with claim 1, wherein the means comprise a plurality of centering pins (13) projecting downward from the underside (12) wherein the centering pins (13) are arranged in such a way that the centering pins (13) at least approximately rest against a centering shoulder (23) for a mini-CD when the calling card (1) is in the CD drive (2).

3. The calling card in accordance with claim 1, wherein the means comprise a plurality of centering beads (13a) projecting downward from the underside (12), wherein the centering beads (13a) are arranged to at least approximately rest against the centering shoulder (23) when the calling card (1) is inserted in the CD drive (2).

4. The calling card in accordance with claim 3, wherein one of the centering pins (13) and the centering beads (13a) are created by plastic deformation.

5. The calling card in accordance with claim 3, wherein one of the centering pins (13) and the centering beads (13a) are glued to the underside (12).

6. The calling card in accordance with claim 5, wherein the calling card (1) has an arbitrary peripheral shape.

7. The calling card in accordance with claim 6, wherein the arbitrary peripheral shape is created by a stamping process.

8. The calling card in accordance with claim 7, wherein one of the centering pins (13) and the centering beads (13a) and the shape is created in the stamping process.

9. The calling card in accordance with claim 2, wherein one of the centering pins (13) and the centering beads (13a) are created by plastic deformation.

10. The calling card in accordance with claim 2, wherein one of the centering pins (13) and the centering beads (13a) are glued to the underside (12).

11. The calling card in accordance with claim 1, wherein the calling card (1) has an arbitrary peripheral shape.

12. The calling card in accordance with claim 11, wherein the arbitrary peripheral shape is created by a stamping process.

13. The calling card in accordance with claim 12, wherein one of the centering pins (13) and the centering beads (13a) and the shape is created in the stamping process.

* * * * *